United States Patent [19]

Bailly et al.

[11] Patent Number: 5,534,600
[45] Date of Patent: Jul. 9, 1996

[54] EXTRUDABLE THERMOPLASTIC COMPOSITION COMPRISING A COMPATIBILIZED POLYPHENYLENE ETHER POLYAMIDE RESIN BLEND

[75] Inventors: Christiaan M. E. Bailly, Kalmthout, Belgium; Christiaan H. J. Koevoets, DJ Roosendaal, Netherlands

[73] Assignee: General Electric Company, Pittsfield, Mass.

[21] Appl. No.: 294,705

[22] Filed: Aug. 23, 1994

[30] Foreign Application Priority Data

Mar. 25, 1994 [EP] European Pat. Off. ............ 94104746.6

[51] Int. Cl.⁶ .............................. C08L 77/00; C08L 71/00
[52] U.S. Cl. ........................... 525/397; 525/392; 525/420
[58] Field of Search ...................................... 525/392, 397, 525/420

[56] References Cited

U.S. PATENT DOCUMENTS

| | | |
|---|---|---|
| 3,257,357 | 6/1966 | Stamatoff et al. . |
| 3,257,358 | 6/1966 | Stamatoff ................................ 528/212 |
| 3,306,874 | 2/1967 | Hay ......................................... 528/215 |
| 3,306,875 | 2/1967 | Hay ......................................... 528/215 |
| 4,315,086 | 2/1982 | Ueno et al. . |
| 4,338,421 | 7/1982 | Maruyama et al. . |
| 4,600,741 | 7/1986 | Aycock et al. . |
| 4,642,358 | 2/1987 | Aycock et al. . |
| 4,654,405 | 3/1987 | Jalbert . |
| 4,659,760 | 4/1987 | van der Meer . |
| 4,728,693 | 3/1988 | Droscher et al. . |
| 4,743,651 | 3/1988 | Shibuya et al. . |
| 4,745,157 | 5/1988 | Yates, III et al. . |
| 4,755,566 | 7/1988 | Yates, III . |
| 4,760,115 | 7/1988 | Droescher et al. . |
| 4,772,664 | 9/1988 | Ueda et al. . |
| 4,792,586 | 12/1988 | Han . |
| 4,798,865 | 1/1989 | Grant et al. . |
| 4,822,836 | 4/1989 | Wroczynski . |
| 4,822,837 | 4/1989 | van der Meer . |
| 4,824,915 | 4/1989 | Aycock et al. . |
| 4,826,933 | 5/1989 | Grant et al. . |
| 4,839,425 | 6/1989 | Mawatari et al. . |
| 4,857,575 | 8/1989 | van der Meer et al. . |
| 4,859,739 | 8/1989 | Yates, III et al. . |
| 4,866,114 | 9/1989 | Taubitz et al. . |
| 4,873,286 | 10/1989 | Gallucci et al. . |
| 4,874,810 | 10/1989 | Lee, Jr. et al. . |
| 4,877,847 | 10/1989 | Masu et al. . |
| 4,885,334 | 12/1989 | Mayumi et al. . |
| 4,888,397 | 12/1989 | van der Meer et al. . |
| 4,889,889 | 12/1989 | Yates, III . |
| 4,923,924 | 5/1990 | Grant . |
| 4,929,675 | 5/1990 | Abe et al. . |
| 4,957,965 | 9/1990 | Taubitz et al. . |
| 4,960,825 | 10/1990 | van der Meer . |
| 4,963,620 | 10/1990 | Grant et al. . |
| 4,968,749 | 11/1990 | Shibuya et al. . |
| 4,981,920 | 1/1991 | Terashima et al. . |
| 4,990,564 | 2/1991 | Taubitz et al. . |
| 5,000,897 | 3/1991 | Chambers . |
| 5,001,181 | 3/1991 | Takagi et al. . |
| 5,017,652 | 5/1991 | Abe et al. . |
| 5,017,663 | 5/1991 | Mizuno et al. . |

(List continued on next page.)

FOREIGN PATENT DOCUMENTS

| | | |
|---|---|---|
| 0147874B1 | 10/1984 | European Pat. Off. . |
| 0222129B1 | 9/1986 | European Pat. Off. . |
| 0221341B1 | 9/1986 | European Pat. Off. . |
| 0234063B1 | 12/1986 | European Pat. Off. . |
| 0237187A1 | 2/1987 | European Pat. Off. . |
| 0253123A1 | 6/1987 | European Pat. Off. . |
| 0234060 | 9/1987 | European Pat. Off. . |
| 0292153A2 | 5/1988 | European Pat. Off. . |
| 0362439A1 | 8/1988 | European Pat. Off. . |
| 0314000A2 | 10/1988 | European Pat. Off. . |
| 0344590A2 | 5/1989 | European Pat. Off. . |
| 0351590A2 | 6/1989 | European Pat. Off. . |
| 0369169A1 | 10/1989 | European Pat. Off. . |
| 0381390A2 | 1/1990 | European Pat. Off. . |
| 0398043A3 | 4/1990 | European Pat. Off. . |
| 0400418A1 | 5/1990 | European Pat. Off. . |
| 0436136A1 | 12/1990 | European Pat. Off. . |
| 0451563A2 | 3/1991 | European Pat. Off. . |
| 0452783A2 | 4/1991 | European Pat. Off. . |
| 0501175A1 | 2/1992 | European Pat. Off. . |
| 0506386A2 | 3/1992 | European Pat. Off. . |
| 0516150A1 | 5/1992 | European Pat. Off. . |
| 0523368A1 | 6/1992 | European Pat. Off. . |
| 0528581A1 | 8/1992 | European Pat. Off. . |
| 0501175 | 9/1992 | European Pat. Off. . |
| 0506386 | 9/1992 | European Pat. Off. . |
| 0491187A1 | 11/1992 | European Pat. Off. . |
| 0550206A2 | 12/1992 | European Pat. Off. . |
| 0549268A2 | 12/1992 | European Pat. Off. . |
| 0559485A1 | 3/1993 | European Pat. Off. . |
| 597648-A1 | 5/1994 | European Pat. Off. . |
| 3-185055 | 8/1991 | Japan . |
| 4-39354 | 2/1992 | Japan . |
| 4-88058 | 3/1992 | Japan . |
| 4-198354 | 7/1992 | Japan . |
| WO88/06167 | 8/1988 | WIPO . |
| WO93/13251 | 7/1993 | WIPO . |

OTHER PUBLICATIONS

Encyclopedia of Polymer Science and Engineering, 2nd ed. vol. 13 p. 4, "Poly(phenylene ether)", Aug. 25, 1988.

Primary Examiner—Shelley A. Dodson
Assistant Examiner—P. Hampton-Hightower

[57] ABSTRACT

The present invention deals with an extrudable thermoplastic composition comprising a compatibilized polyphenylene ether-polyamide resin blend. By using a polyphenylene ether with an intrinsic viscosity of more than 45 ml/g as measurred in toluene at 25 degrees C. and a concentration of 0.6 gram per 100 ml and a polyamide with a reduced viscosity of more than 175 ml/g as measured in sulphuric acid in accordance with ISO 307, it proved to be possible to obtain a blend which could be extruded without difficulties. Blends in which only one of the two resins i.e. the polyphenylene ether or the polyamide possessed the required viscosity values were less suitable for processing by extrusion.

The composition may further comprise other usual additives.

12 Claims, No Drawings

U.S. PATENT DOCUMENTS

| | | |
|---|---|---|
| 5,019,626 | 5/1991 | Taubitz et al. . |
| 5,026,787 | 6/1991 | Takagi et al. . |
| 5,039,746 | 8/1991 | Neugebauer et al. . |
| 5,041,504 | 8/1991 | Brown et al. . |
| 5,053,458 | 10/1991 | Taubitz et al. . |
| 5,055,494 | 10/1991 | van der Meer . |
| 5,069,818 | 12/1991 | Aycock et al. . |
| 5,070,151 | 12/1991 | Mizuno et al. . |
| 5,073,596 | 12/1991 | Inoue et al. . |
| 5,073,620 | 12/1991 | Sanada et al. . |
| 5,084,523 | 1/1992 | Neugebauer et al. . |
| 5,086,105 | 2/1992 | Abe et al. . |
| 5,091,473 | 2/1992 | Arashiro et al. . |
| 5,096,979 | 3/1992 | Brown et al. . |
| 5,109,052 | 4/1992 | Kasai et al. . |
| 5,112,907 | 5/1992 | Nishio et al. . |
| 5,115,010 | 5/1992 | Sakai et al. . |
| 5,115,044 | 5/1992 | Neugebauer . |
| 5,120,800 | 6/1992 | Tsukahara et al. . |
| 5,120,801 | 6/1992 | Chambers . |
| 5,122,575 | 6/1992 | White et al. . |
| 5,124,391 | 6/1992 | Muehlbach et al. . |
| 5,134,196 | 7/1992 | van der Meer . |
| 5,145,904 | 9/1992 | Muehlbach et al. . |
| 5,147,942 | 9/1992 | Abe et al. . |
| 5,153,266 | 10/1992 | Muehlbach et al. . |
| 5,159,008 | 10/1992 | Nishida et al. . |
| 5,159,009 | 10/1992 | Wolff et al. ............................ 524/495 |
| 5,159,018 | 10/1992 | Nishio et al. . |
| 5,159,075 | 10/1992 | Phanstiel et al. . |
| 5,162,433 | 11/1992 | Nishio et al. . |
| 5,162,440 | 11/1992 | Akkepeddi et al. . |
| 5,162,447 | 11/1992 | Abe et al. . |
| 5,166,237 | 11/1992 | Abe et al. . |
| 5,175,211 | 12/1992 | Sanada et al. . |
| 5,182,336 | 1/1993 | Abe et al. . |
| 5,210,125 | 5/1993 | Pernice et al. . |
| 5,212,256 | 5/1993 | Mizuno et al. . |
| 5,225,270 | 7/1993 | Bhoori et al. . |
| 5,237,002 | 8/1993 | Nishio et al. . |
| 5,244,973 | 9/1993 | Sakazume et al. . |
| 5,248,728 | 9/1993 | Lee, Jr. . |
| 5,262,478 | 11/1993 | Nishio et al. . |
| 5,266,673 | 11/1993 | Tsukahara et al. . |
| 5,288,786 | 2/1994 | Nishio et al. . |
| 5,296,533 | 3/1994 | Nagaoka et al. . |
| 5,310,821 | 5/1994 | Kodaira et al. . |
| 5,331,060 | 7/1994 | Aycock et al. . |
| 5,336,732 | 8/1994 | Samuels . |
| 5,378,750 | 1/1995 | Sayed et al. . |

EXTRUDABLE THERMOPLASTIC COMPOSITION COMPRISING A COMPATIBILIZED POLYPHENYLENE ETHER POLYAMIDE RESIN BLEND

BACKGROUND OF THE INVENTION

1. Field of the Invention

The invention relates to thermoplastic compositions comprising a compatibilized polyphenylene ether-polyamide resin blend which is suitable for extrusion.

The invention also relates to articles formed out of the compositions of the invention.

2. Brief Description of the Related Art

Commercially available blends of polyphenylene ether and polyamide are less suitable for molding into the desired shapes by extrusion; they are manufactured by a compounding-extrusion step, followed by pellitization. The obtained pellets are then usually processed by injection molding into the desired shapes.

It is generally known to increase the molecular weight and hence the viscosity of thermoplastic resins to make them better suitable for molding by extrusion. The use of thermoplastics resins with increased viscosity results in higher melt strenght values as necessary for extrusion-molding.

The commercially most interesting blends of polyphenylene ether and polyamide comprise a continuous phase of polyamide in which the polyphenylene ether is dispersed. It would thus be expected that an increase of the viscosity of the polyamide only would make the blend more suitable for molding by extrusion. An increase of the melt viscosity did indeed occur by using a polyamide with increased viscosity in combination with a polyphenylene ether of standard viscosity. Unfortunately this blend with a normal polyphenylene ether showed a very undesirable effect: upon extrusion in the manufacturing step so-called die-swell occurred to such an extent that the product was not uniform in thickness and not well processable.

SUMMARY OF THE INVENTION

It has now been found that by using a combination of a polyphenylene ether with a specific viscosity which is higher than usual and of a polyamide with a viscosity which is higher than usual it is possible to obtain a blend with a satisfactory melt strength without occurrence of the die-swell phenomena.

In the thermoplastic composition of the invention the polyphenylene ether has an intrinsic viscosity of more than 45 ml/g as measured in toluene at 25 degrees C. and a concentration of 0.6 gram per 100 ml and the polyamide has a reduced viscosity of more than 175 ml/g as measured in sulphuric acid in accordance with ISO 307.

The polyphenylene ether in the blends of the invention preferably have an intrinsic viscosity of at least 50 ml/g. The polyamide preferably has a reduced viscosity of at least 190 ml/g.

Preferred polyphenylene ether resins (PPE) and polyamide resins as well as means for providing compatibilized combinations thereof are described below.

In general it is desirable that the polyamide component forms the continuous phase in the blend and, therefore, typically at least 35 percent by weight of the total PPE-polyamide-composition will be comprised of the polyamide component.

DETAILED DESCRIPTION OF THE INVENTION

Polyphenylene ethers are a well known class of compounds sometimes referred to as polyphenylene oxides. Examples of suitable polyphenylene ethers and processes for their preparation can be found in U.S. Pat. Nos. 3,306,874; 3,306,875; 3,257,357; and 3,257,358. Compositions of the present invention will encompass homopolymers, copolymers and graft copolymers obtained by the oxidative coupling of phenolic compounds. The preferred polyphenylene ethers used as base resins in compositions of the present invention will be comprised of ml/g derived from 2,6-dimethyl phenol. Also contemplated are polyphenylene ether copolymers comprising of ml/g derived from 2,6-dimethyl phenol and 2,3,6-trimethyl phenol.

A particularly useful polyphenylene ether would be poly(2,6-dimethyl- 1,4-phenylene ether) having an intrinsic viscosity (I.V.) of more than 50 ml/g as measured in toluene at 25 degrees C. and a concentration of 0.6 gram per 100 ml.

The polyamide resins useful in the practice of the present invention are a generic family of resins known as nylons, characterized by the presence of an amide group (—CONH—). Nylon-6 and nylon-6,6 are the generally preferred polyamides and are available from a variety of commercial sources. Other polyamides, however, such as nylon-4, nylon-12, nylon-6,10, nylon 6,9 or others such as the amorphous nylons may be useful for particular polyphenylene ether-polyamide applications. The most preferred polyamide for the blends of the present invention is the polyamide-6,6.

The polyamides can be obtained by a number of well known processes. Nylon-6, for example, is a polymerization product of caprolactam. Nylon-6,6 is a condensation product of adipic acid and hexamethylenediamine. A nylon-6,6 having reduced viscosity of more than 175 ml/g, preferably of at least 190 ml/gas measured in sulphuric acid in accordance with ISO 307 is the most preferred type of polyamide.

In blends of the present invention, a compatibilizing agent should be employed in the preparation of the composition. The two-fold purpose for using compatilizing agents is to improve, in general, the physical properties of the polyphenylene ether-polyamide resin blend, as well as to enable the use of a greater proportion of the polyamide component. When used herein, the expression "compatibilizing agent" refers to those polyfunctional compounds which interact with either the polyphenylene ether, the polyamide, or both. This interaction may be chemical (e.g. grafting) or physical (e.g. affecting the surface characteristics of the dispersed phases). In either instance the resulting polyphenylene ether-polyamide composition appears to exhibit improved compatibility, particularly as evidenced by enhanced impact strength, mold knit line strength and/or elongation. As used herein, the expression "compatibilized polyphenylene ether-polyamide base resin" refers to those compositions which have been physically or chemically compatibilized with an agent as discussed above, as well as those compositions which are physically compatible without such agents, as taught in U.S. Pat. No. 3,379,792.

Examples of the various compatibilizing agents that may be employed in the practice of the present invention include: a) liquid diene polymers, b) epoxy compounds, c) oxidized polyolefin wax, d) quinones, e) organosilane compounds, f) polyfunctional compounds and functionalized polyphenylene ethers as described obtained by reacting one or more of the previously mentioned compatibilizing agents with a polyphenylene ether hereinafter.

Liquid diene polymers (a) suitable for use herein include homopolymers of a conjugated diene with at least one monomer selected from the group consisting of other conjugated dienes; vinyl monomer, e.g. styrene and alphamethyl styrene; olefins, e.g. ethylene, propylene, butene-1, isobutylene, hexene-1, octene-1 and dodecene-1, and mixtures thereof, having a number average molecular weight of from 150 to 10,000 preferably 150 to 5,000. These homopolymers and copolymers can be produced by the methods described in, for example, U.S. Pat. Nos. 4,054,612; 3,876,721 and 3,428,699 and include, among others, polybutadiene, polyisoprene, poly(1,3-pentadiene), poly(butadiene-isoprene), poly(styrene-butadiene), polychloroprene, poly(butadiene-alpha methylstyrene), poly(butadiene-styrene-isoprene), poly(butylene-butadiene) and the like.

Epoxy compounds (b) suitable for use in the practice of the present invention include: (1) epoxy resins produced by condensing polyhydric phenols (e.g. bisphenol-A, tetrabromobisphenol-A, resorcinol and hydroquinone) and epichlorohydrin; (2) epoxy resins produced by condensing polyhydric alcohols (e.g.ethylene glycol, propylene glycol, butylene glycol, polyethylene glycol, polypropylene glycol, pentaerythritol and trimethylolethane and the like) and epichlorohydrin, (3) glycidyletherified products of monohydric alcohols and monohydric phenols including phenyl glycidylether, butyl glycidyl ether and cresyl glycidylether; (4) glycidyl derivates of animo compounbds for example, the diglycidyl derivate of aniline, and (5) epoxidized products of higher olefinic or cycloalkene, or natural unsaturated oils (e.g. soybean) as well as of the foregoing liquid diene polymers.

Oxidized polyolefin waxes (c) are well known and a description thereof and processes for the production of the same are found in U.S. Pat. Nos. 3,822,227 and 3,756,999 and German Patent Publications 3,047,915 and 2,201,862.

Generally, these are prepared by an oxidaton or suspension oxidation of polyolefin. An especially preferred polyolefin wax is "Hoechst Wachs".

Quinone compounds (d) suitable for use herein are characterized as having in the molecule of the unsubstituted derivative at least one 6 membered carbon ring; at least two carbonyl groups in the ring structure, both of which may be in the same or, if more than one ring, different rings, provided that they occupy positions corresponding to the 1,2- or 1,4-orientation of the monocyclic quinone; and at least two carbon-carbon double bonds in the ring structure, said carbon-carbon double bounds and carbonyl carbon-carbon double bonds in the ring structure, said carbon-carbon double bonds and carbonyl carbon-oxygen double bonds being conjugated with respect to each other. Where more than one ring is present in the unsubstituted quinone, the rings may be fused, non-fused or both: non-fused rings may be bound by a direct carbon-carbon double bond or by a hydrocarbon radical having conjugated unsaturation such as =C—C=.

Substituted quinones are also within the scope of the present invention. The degree of substitution; where substitution is desired, may be from one to the maximum number of replaceable hydrogen atoms. Examplary of the various substituents that may be present on the unsubstituted quinone structures include halogen, e.g. chlorine, bromine, flourine, etc. hydrocarbon radicals insclusding branched and unbranched, saturated and unsaturated alkyl, aryl, alkyl aryl and cycloalkyl radicals and halogenated derivatives thereof; and similar hydrocarbons having hetero atoms therein, articularly oxygen, sulfur or phosphorous and wherein the same connects the radical to the quinone ring (e.g. oxygen link).

Examplary of the various quinones there may be given 1,2- and 1,4-benzoquinone; 2,6-diphenyl quinone; tetramethyldiquinone; 2,2'- and 4,4'-diphenoquinone; 1,2-, 1,4- and 2,6-naphthoquinone; chloranils; 2-chloro- 1,4-benzoquinone; 2,6-dimethyl benzoquinone and the like.

Organosilane compounds (e) suitable as compatibilizing agents are characterized as having in the molecule (a) at least one silicon atom bonded to a carbon through an oxygen link and (b) at least one carbon-carbon double bond or carbon-carbon triple bond and/or a functional group selected from the group consisting of an amine group or a mercapto group provided that the functional group is not directly bonded to the silicon atom.

In such compounds, the C—O—Si component is generally present as an alkoxyl or acetoxy group bonded directly to the silicon atom, wherein the alkoxy or acetoxy group generally has less than 15 carbon atoms and may also contain hetero atoms (e.g. oxygen). Additionally, there may also be more than one silicon atom in the compound, such multiple silicon atoms, if present, being linked through an oxygen link (e.g. siloxanes), a silicon bond; or a bifunctional organic radical (e.g. methylene or phenylene groups).

Examples of suitable organosilane compounds include: gamma amino propyltriethoxy silane, 2-(3-cyclohexanyl-)ethyl trimethoxy silane; 1,3-divinyl tetraethoxy silane; vinyl tris-(2-methoxyethoxy)silane; 5-bicycloheptenyl triethoxy silane and gamma mercapto propyl trimethoxy silane.

Polyfunctional compounds (f) which may be employed as compatibilizer in the practice of the present invention are of three types. The first type of polyfunctional compounds are those having in the molecule both (a) a carbon-carbon double bond or a carbon-carbon triple bond and b) at least one carboxylic acid, acid anhydride, acid halide, anhydride, acid halide anhydride, acid amide, acid ester, imide, amino, or hydroxy group. Examples of such polyfunctional compounds include maleic acid; maleic anhydride; fumaric acid; citraconic acid; itatonic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (e.g. acrylic acid, butenoic acid, methacrylic acid, t-ethylacrylic acid, pentenoic acid); decenoic acids, undecenoic acids, dodecenoic acids, linoleic acid, etc.); esters, acid amides or anhydrides of the foregoing unsaturated carboxylic acids; unsaturated alcohols (e.g. alkyl alcohol, crotyl alcohol, methyl vinyl carbinol, 4-pentene-1-ol, 1,4-hexadiene- 3-ol, 3-butene- 1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is a positive integer up to 30), unsaturated amines resulting from replacing from replacing the —OH group(s) of the above unsaturated alcohols with $NH_2$ groups; and functionalized diene polymers and copolymers. Of these, one of the preferred compatibilizing agents for compositions of the present invention is maleic anhydride.

The second group of polyfunctional compatibilizer compounds suitable for use herein are charaterized as having both (a) a group represented by the formula (OR) wherein R is hydrogen or an alkyl, aryl, acyl or carbonyl dioxy group and (b) at least two groups each of which may be the same or different selected from carboxylic acid, acid halide, acid anhydride, anhydride, acid halide anhydride, acid ester, acid amide, imido, amino and salts thereof. Typical of this group

EXTRUDABLE THERMOPLASTIC COMPOSITION COMPRISING A COMPATIBILIZED POLYPHENYLENE ETHER POLYAMIDE RESIN BLEND

BACKGROUND OF THE INVENTION

1. Field of the Invention

The invention relates to thermoplastic compositions comprising a compatibilized polyphenylene ether-polyamide resin blend which is suitable for extrusion.

The invention also relates to articles formed out of the compositions of the invention.

2. Brief Description of the Related Art

Commercially available blends of polyphenylene ether and polyamide are less suitable for molding into the desired shapes by extrusion; they are manufactured by a compounding-extrusion step, followed by pellitization. The obtained pellets are then usually processed by injection molding into the desired shapes.

It is generally known to increase the molecular weight and hence the viscosity of thermoplastic resins to make them better suitable for molding by extrusion. The use of thermoplastics resins with increased viscosity results in higher melt strenght values as necessary for extrusion-molding.

The commercially most interesting blends of polyphenylene ether and polyamide comprise a continuous phase of polyamide in which the polyphenylene ether is dispersed. It would thus be expected that an increase of the viscosity of the polyamide only would make the blend more suitable for molding by extrusion. An increase of the melt viscosity did indeed occur by using a polyamide with increased viscosity in combination with a polyphenylene ether of standard viscosity. Unfortunately this blend with a normal polyphenylene ether showed a very undesirable effect: upon extrusion in the manufacturing step so-called die-swell occurred to such an extent that the product was not uniform in thickness and not well processable.

SUMMARY OF THE INVENTION

It has now been found that by using a combination of a polyphenylene ether with a specific viscosity which is higher than usual and of a polyamide with a viscosity which is higher than usual it is possible to obtain a blend with a satisfactory melt strength without occurrence of the die-swell phenomena.

In the thermoplastic composition of the invention the polyphenylene ether has an intrinsic viscosity of more than 45 ml/g as measured in toluene at 25 degrees C. and a concentration of 0.6 gram per 100 ml and the polyamide has a reduced viscosity of more than 175 ml/g as measured in sulphuric acid in accordance with ISO 307.

The polyphenylene ether in the blends of the invention preferably have an intrinsic viscosity of at least 50 ml/g. The polyamide preferably has a reduced viscosity of at least 190 ml/g.

Preferred polyphenylene ether resins (PPE) and polyamide resins as well as means for providing compatibilized combinations thereof are described below.

In general it is desirable that the polyamide component forms the continuous phase in the blend and, therefore, typically at least 35 percent by weight of the total PPE-polyamide-composition will be comprised of the polyamide component.

DETAILED DESCRIPTION OF THE INVENTION

Polyphenylene ethers are a well known class of compounds sometimes referred to as polyphenylene oxides. Examples of suitable polyphenylene ethers and processes for their preparation can be found in U.S. Pat. Nos. 3,306,874; 3,306,875; 3,257,357; and 3,257,358. Compositions of the present invention will encompass homopolymers, copolymers and graft copolymers obtained by the oxidative coupling of phenolic compounds. The preferred polyphenylene ethers used as base resins in compositions of the present invention will be comprised of ml/g derived from 2,6-dimethyl phenol. Also contemplated are polyphenylene ether copolymers comprising of ml/g derived from 2,6-dimethyl phenol and 2,3,6-trimethyl phenol.

A particularly useful polyphenylene ether would be poly(2,6-dimethyl- 1,4-phenylene ether) having an intrinsic viscosity (I.V.) of more than 50 ml/g as measured in toluene at 25 degrees C. and a concentration of 0.6 gram per 100 ml.

The polyamide resins useful in the practice of the present invention are a generic family of resins known as nylons, characterized by the presence of an amide group (—CONH—). Nylon-6 and nylon-6,6 are the generally preferred polyamides and are available from a variety of commercial sources. Other polyamides, however, such as nylon-4, nylon-12, nylon-6,10, nylon 6,9 or others such as the amorphous nylons may be useful for particular polyphenylene ether-polyamide applications. The most preferred polyamide for the blends of the present invention is the polyamide-6,6.

The polyamides can be obtained by a number of well known processes. Nylon-6, for example, is a polymerization product of caprolactam. Nylon-6,6 is a condensation product of adipic acid and hexamethylenediamine. A nylon- 6,6 having reduced viscosity of more than 175 ml/g, preferably of at least 190 ml/gas measured in sulphuric acid in accordance with ISO 307 is the most preferred type of polyamide.

In blends of the present invention, a compatibilizing agent should be employed in the preparation of the composition. The two-fold purpose for using compatilizing agents is to improve, in general, the physical properties of the polyphenylene ether-polyamide resin blend, as well as to enable the use of a greater proportion of the polyamide component. When used herein, the expression "compatibilizing agent" refers to those polyfunctional compounds which interact with either the polyphenylene ether, the polyamide, or both. This interaction may be chemical (e.g. grafting) or physical (e.g. affecting the surface characteristics of the dispersed phases). In either instance the resulting polyphenylene ether-polyamide composition appears to exhibit improved compatibility, particularly as evidenced by enhanced impact strength, mold knit line strength and/or elongation. As used herein, the expression "compatibilized polyphenylene ether-polyamide base resin" refers to those compositions which have been physically or chemically compatibilized with an agent as discussed above, as well as those compositions which are physically compatible without such agents, as taught in U.S. Pat. No. 3,379,792.

Examples of the various compatibilizing agents that may be employed in the practice of the present invention include: a) liquid diene polymers, b) epoxy compounds, c) oxidized polyolefin wax, d) quinones, e) organosilane compounds, f) polyfunctional compounds and functionalized polyphenylene ethers as described obtained by reacting one or more of the previously mentioned compatibilizing agents with a polyphenylene ether hereinafter.

Liquid diene polymers (a) suitable for use herein include homopolymers of a conjugated diene with at least one monomer selected from the group consisting of other conjugated dienes; vinyl monomer, e.g. styrene and alphamethyl styrene; olefins, e.g. ethylene, propylene, butene-1, isobutylene, hexene-1, octene-1 and dodecene-1, and mixtures thereof, having a number average molecular weight of from 150 to 10,000 preferably 150 to 5,000. These homopolymers and copolymers can be produced by the methods described in, for example, U.S. Pat. Nos. 4,054,612; 3,876,721 and 3,428,699 and include, among others, polybutadiene, polyisoprene, poly(1,3-pentadiene), poly(butadiene-isoprene), poly(styrene-butadiene), polychloroprene, poly(butadiene-alpha methylstyrene), poly(butadiene-styrene-isoprene), poly(butylene-butadiene) and the like.

Epoxy compounds (b) suitable for use in the practice of the present invention include: (1) epoxy resins produced by condensing polyhydric phenols (e.g. bisphenol-A, tetrabromobisphenol-A, resorcinol and hydroquinone) and epichlorohydrin; (2) epoxy resins produced by condensing polyhydric alcohols (e.g. ethylene glycol, propylene glycol, butylene glycol, polyethylene glycol, polypropylene glycol, pentaerythritol and trimethylolethane and the like) and epichlorohydrin, (3) glycidyletherified products of monohydric alcohols and monohydric phenols including phenyl glycidylether, butyl glycidyl ether and cresyl glycidylether; (4) glycidyl derivates of animo compounbds for example, the diglycidyl derivate of aniline, and (5) epoxidized products of higher olefinic or cycloalkene, or natural unsaturated oils (e.g. soybean) as well as of the foregoing liquid diene polymers.

Oxidized polyolefin waxes (c) are well known and a description thereof and processes for the production of the same are found in U.S. Pat. Nos. 3,822,227 and 3,756,999 and German Patent Publications 3,047,915 and 2,201,862.

Generally, these are prepared by an oxidaton or suspension oxidation of polyolefin. An especially preferred polyolefin wax is "Hoechst Wachs".

Quinone compounds (d) suitable for use herein are characterized as having in the molecule of the unsubstituted derivative at least one 6 membered carbon ring; at least two carbonyl groups in the ring structure, both of which may be in the same or, if more than one ring, different rings, provided that they occupy positions corresponding to the 1,2- or 1,4-orientation of the monocyclic quinone; and at least two carbon-carbon double bonds in the ring structure, said carbon-carbon double bounds and carbonyl carbon-carbon double bonds in the ring structure, said carbon-carbon double bonds and carbonyl carbon-oxygen double bonds being conjugated with respect to each other. Where more than one ring is present in the unsubstituted quinone, the rings may be fused, non-fused or both: non-fused rings may be bound by a direct carbon-carbon double bond or by a hydrocarbon radical having conjugated unsaturation such as $=C-C=$.

Substituted quinones are also within the scope of the present invention. The degree of substitution; where substitution is desired, may be from one to the maximum number of replaceable hydrogen atoms. Examplary of the various substituents that may be present on the unsubstituted quinone structures include halogen, e.g. chlorine, bromine, flourine, etc. hydrocarbon radicals inclusding branched and unbranched, saturated and unsaturated alkyl, aryl, alkyl aryl and cycloalkyl radicals and halogenated derivatives thereof; and similar hydrocarbons having hetero atoms therein, articularly oxygen, sulfur or phosphorous and wherein the same connects the radical to the quinone ring (e.g. oxygen link).

Examplary of the various quinones there may be given 1,2- and 1,4-benzoquinone; 2,6-diphenyl quinone; tetramethyldiquinone; 2,2'- and 4,4'-diphenoquinone; 1,2-, 1,4- and 2,6-naphthoquinone; chloranils; 2-chloro- 1,4-benzoquinone; 2,6-dimethyl benzoquinone and the like.

Organosilane compounds (e) suitable as compatibilizing agents are characterized as having in the molecule (a) at least one silicon atom bonded to a carbon through an oxygen link and (b) at least one carbon-carbon double bond or carbon-carbon triple bond and/or a functional group selected from the group consisting of an amine group or a mercapto group provided that the functional group is not directly bonded to the silicon atom.

In such compounds, the C—O—Si component is generally present as an alkoxyl or acetoxy group bonded directly to the silicon atom, wherein the alkoxy or acetoxy group generally has less than 15 carbon atoms and may also contain hetero atoms (e.g. oxygen). Additionally, there may also be more than one silicon atom in the compound, such multiple silicon atoms, if present, being linked through an oxygen link (e.g. siloxanes), a silicon bond; or a bifunctional organic radical (e.g. methylene or phenylene groups).

Examples of suitable organosilane compounds include: gamma amino propyltriethoxy silane, 2-(3-cyclohexanyl-)ethyl trimethoxy silane; 1,3-divinyl tetraethoxy silane; vinyl tris-(2-methoxyethoxy)silane; 5-bicycloheptenyl triethoxy silane and gamma mercapto propyl trimethoxy silane.

Polyfunctional compounds (f) which may be employed as compatibilizer in the practice of the present invention are of three types. The first type of polyfunctional compounds are those having in the molecule both (a) a carbon-carbon double bond or a carbon-carbon triple bond and b) at least one carboxylic acid, acid anhydride, acid halide, anhydride, acid halide anhydride, acid amide, acid ester, imide, amino, or hydroxy group. Examples of such polyfunctional compounds include maleic acid; maleic anhydride; fumaric acid; citraconic acid; itatonic acid; maleimide; maleic hydrazide; reaction products resulting from a diamine and maleic anhydride, maleic acid, fumaric acid, etc.; dichloro maleic anhydride; maleic acid amide; unsaturated dicarboxylic acids (e.g. acrylic acid, butenoic acid, methacrylic acid, t-ethylacrylic acid, pentenoic acid); decenoic acids, undecenoic acids, dodecenoic acids, linoleic acid, etc.); esters, acid amides or anhydrides of the foregoing unsaturated carboxylic acids; unsaturated alcohols (e.g. alkyl alcohol, crotyl alcohol, methyl vinyl carbinol, 4-pentene-1-ol, 1,4-hexadiene- 3-ol, 3-butene- 1,4-diol, 2,5-dimethyl-3-hexene-2,5-diol and alcohols of the formula $C_nH_{2n-5}OH$, $C_nH_{2n-7}OH$ and $C_nH_{2n-9}OH$, wherein n is a positive integer up to 30), unsaturated amines resulting from replacing from replacing the —OH group(s) of the above unsaturated alcohols with $NH_2$ groups; and functionalized diene polymers and copolymers. Of these, one of the preferred compatibilizing agents for compositions of the present invention is maleic anhydride.

The second group of polyfunctional compatibilizer compounds suitable for use herein are charaterized as having both (a) a group represented by the formula (OR) wherein R is hydrogen or an alkyl, aryl, acyl or carbonyl dioxy group and (b) at least two groups each of which may be the same or different selected from carboxylic acid, acid halide, acid anhydride, anhydride, acid halide anhydride, acid ester, acid amide, imido, amino and salts thereof. Typical of this group of compatibilizers are the aliphatic polycarboxylic acids, acid esters and acid amides represented by the formula:

$(R'O)_m R(COOR'')_n (CONR'''R^{IV})_s$ wherein R is a linear or branched chain, saturated aliphatic hydrocarbon of from 2 to 20, preferably 2 to 10, carbon atoms; $R'$ is selected from the group consisting of hydrogen or an alkyl, aryl, acyl or carbonyl dioxy group of 1 to 10, preferably 1 to 6, most preferably 1 to 4, carbon atoms, especially preferred is hydrogen; each $R''$ is independently selected from the group consisting of hydrogen or an alkyl or aryl group from 1 to 20 carbon atoms, preferably from 1 to 10 carbon atoms; each $R'''$ and $R^{IV}$ is independently selected from the group consisting essentially of hydrogen or an alkyl or aryl group of from 1 to 10, preferably from 1 to 6, most preferably 1 to 4, carbon atoms; m is equal to 1 and (n+s) is greater than or equal to 2, preferably equal to 2 or 3, and n and s are each greater than or equal to zero and wherein $(OR')$ is alpha or beta to a carbonyl group and at least two carbonyl groups are seperated by 2 to 6 carbon atoms. Obviously, $R'$, $R''$, $R'''$ and $R^{IV}$ cannot be aryl when the respective substituent has less than 6 carbon atoms.

Illustrative of suitable polycarboxylic acids there may be given citric acid, malic acid, and agaricic acid; including the various commercial forms thereof, such as for example, the anhydrous and hydrated acids. Of these, citric acid is another of the preferred compatibilizing agents. Illustrative of acid esters useful herein include for example, acetyl citrate and mono- and/or distearyl citrates and the like. Suitable acid amides useful herein include for example N,N'-diethyl citric acid amide; N-phenyl citric acid amide; N-dodecyl citric acid amide; N,N'-didodecyl citric acid amide and N-dodecyl malic acid present invention. Especially preferred derivates are the salts thereof, including the salts with amines and/ preferably, the alkali and alkaline metal salts. Examplary of suitable salts include calcium malate, calcium citrate, potassium malate and potassium citrate.

The third group of polyfuntional compatibilizer compounds suitable for use herein are characterized as having in the molecule both (a) an acid halide group, most preferably an acid chloride group and (b) at least one carboxylic acid, carboxylic acid anhydride, acid ester or acid amide group, preferably a carboxylic acid or carboxylic acid anhydride group. Exemplary of compatibilizers within this group there may be given trimellitic anhydride acid chloride, chloroformyl succinic anhydride, chloro formyl succinic acid, chloroformyl glutaric anhydride, chloroformyl glutaric acid, chloroacetyl succinic anhydride, chloroacetylsuccinic acid, trimellitic acid chloride and chloroacetyl glutaric acid. Among these, trimellitic anhydride acid chloride is preferred. Furthermore, it is especially preferred that compatibilizers of this group be prereacted with at least a portion of the polyphenylene ether whereby the compatibilizing agent is a PPE-functionalized compound.

Each of the foregoing compatibilizing agents are more fully described in U.S. Pat. Nos. 4,315,086 and 4,642,358; and European Patent Application No. 04640.

The foregoing compatibilizing agents may be used alone or in any combination of one another. Furthermore, they may be added directly to the melt blend or precompounded with either or both the polyphenylene ether and polyamide as well as with other resinous materials employed in the preparation of the compositions of the present invention. With many of the foregoing compatibilizing agents, particularly the polyfunctional compounds, even greater improvement in compatibility is found where at least a portion of the compatibilizing agent is precompounded with all or part of the polyphenylene ether. It is believed that such precompounding may cause the compatibilizing agent to react with the polymer and, consequently, functionalize that polymer as noted above for example, the polyphenylene oxide may be precompounded with trimellitic anhydride acid chloride to form an anhydride functionalized polyphenylene ether which has improved compatibility with the polyamide compared to a non-functionalized ether.

Where the compatibilizing agent is employed in the preparation of the compositions of the present invention, the initial amount used will be dependent upon the specific compatibilizing agent chosen and the specific polymeric system to which is added.

It is possible to use in the composition according to the invention any other known compatibilisation system. Other systems have been described for example in U.S. Pat. No. 4,866,114.

It is possible to incorporate in the composition according to the invention one or more impact modifiers. All impact modifiers as generally used for compositions comprising a polyphenylene ether, a polyamide or a combination of a polyphenylene ether and a polyamide can be used. Particularly suitable are the socalled blockcopolymers, like triblock copolymers and diblockcopolymers.

A variety of useful polyphenylene ether-polyamide compositions can be provided which include varying amount of the impact modifier. Typically, improved properties, especially regarding the ductile behavior of the plastic, will be noted when 1 to 30 parts ny weight of an impact modifier are utilized per 100 parts of the polyphenylene ether and polyamide components taken together.

The diblock or triblock copolymer rubber additive which may be used in compositions of the present invention is a thermoplastic rubber comprised of one or two alkenyl aromatic blocks which are typically styrene blocks and a rubber block e.g. a butadiene block which may be partially hydrogenated.

The thermoplastic composition of the invention may comprise any of the following additives: reinforcing fibers, stabilizers, dyes, pigments, polyolefines, flame retardants.

Glass reinforced grades of compatibilized polyphenylene etherpolyamide resin compositions are extremely important in thermoplastic applications requiring a unique combination of physical properties such as impact strength, rigidity and modulus, dimensional stability, high heat resistance as well as chemical resistance. Principally, glass filled PPE-polyamide compositions of the present invention offer good physical properties. Ten to thirty weight percent loadings of chopped glass fiber can typically be utilized to advantage in these compositions. These weight percents would be based upon the weight of the polyphenylene ether resin, the polyamide resin, and the glass, taken together. More or less glass (e.g. 5 to 45 weight percent) can also be utilized in certain circumstances. Less than about 5 parts glass begins to perform like an unreinforced product. More than about 45 weight percent glass begins to interfere with the ability of the resin to coat and bind the glass effectively.

All patents and patent applications mentioned above are incorporated herein by reference.

The invention will be further illustrated by the following examples.

EXAMPLES

In the examples the following materials have been used:
PPE-1: a poly(2,6-dimethyl-1,4-phenylene ether) with an intrinsic viscosity of 40 ml/g as measured in toluene at 25 degrees C. and a concentration of 0.6 gram per 100 ml PPO 803);

PPE-2: a poly(2,6-dimethyl-1,4-phenylene ether) with an intrinsic viscosity of 45 ml/g as measured in toluene at 25 degrees C. and a concentration of 0.6 gram per 100 ml PPO 800);

PPE-3: a poly(2,6-dimethyl-1,4-phenylene ether) with an intrinsic viscosity of 57 ml/g as measurred in toluene at 25 degrees C. and a concentration of 0.6 gram per 100 ml PPO 805);

PA-1: a polyamide-6,6 with a reduced viscosity of 145 ml/g as measured in sulphuric acid in accordance with ISO 307.(A3Q44)

PA-2: a polyamide-6,6 with a reduced viscosity of 205 ml/g as measured in sulphuric acid in accordance with ISO 307.(A4)

PA-3: a polyamide-6,6 with a reduced viscosity of 270 ml/g as measured in sulphuric acid in accordance with ISO 307.(A5)

CA: citric acid.

ST: standard iodine based stabilizers

PETS: penta-erythritol tetrastearate

CB: carbon black

The ingredients were compounded in the quantities as indicated in the following table in a twin screw extruder with six different temperature settings over the length of the exruder, varying between 280 and 310 degrees C. The screw speed was 300 rounds per minute, the throughput 10 kilograms per hour. All ingredients with exception of the polyamid were fed at the throat of the extruder; the polyamid was feeded downstreams about halfway the extruder.

The die of the extruder had a diameter of 4 mm. Some of the blends coming out of the extruder suffered from die-swell, meaning that the strands had a varying diameter far above 4 mm. This is an entirely undesirable effect, since this causes greaet unstability. This makes the blends unsuitable for molding formed products out of them by means of extrusion and unsuitable for pellitizing them in a regular production process.

The strands coming from the extruder were pelletized in a laboratory equipment and dried for 3 hours at 110 degrees C.

The dried pellets were brought into the extruder of a Rheotens melt viscosity instrument of Goettfert-Feinwerk-Technik GmbH. The apparatus comprises an extruder with an extrusion head with a die diameter of 4 mm and two wheels place at a distance of 120 mm below the extrusion head. The strand is conducted between the wheels which turn around with increasing speed. The tensile speed and the tensile force are monitored. Upon occurrence of an unstability they are measured; the melt strenght in Newton is calculated based on the measured values. The results are also given in the table here below.

TABLE

| Example | A* | B* | C* | I | II | III | IV |
| --- | --- | --- | --- | --- | --- | --- | --- |
| Composition (Parts by weight) | | | | | | | |
| PPE-1: | 58.9 | 58.9 | — | — | — | — | — |
| PPE-2: | — | — | — | — | — | — | 58.9 |
| PPE-3: | — | — | 58.9 | 58.9 | 58.9 | 53.9 | — |
| PA-1: | 40 | — | 40 | — | — | — | — |
| PA-2: | — | 40 | — | 40 | — | 45 | 40 |
| PA-3: | — | — | — | — | 40 | — | — |

TABLE-continued

| Example | A* | B* | C* | I | II | III | IV |
| --- | --- | --- | --- | --- | --- | --- | --- |
| CA: | 0.7 | 0.7 | 0.7 | 0.7 | 0.7 | 0.7 | 0.7 |
| ST: | 0.1 | 0.1 | 0.1 | 0.1 | 0.1 | 0.3 | 0.1 |
| PETS: | 0.3 | 0.3 | 0.3 | 0.3 | 0.3 | 0.3 | 0.3 |
| CB: | 0.1 | 0.1 | 0.1 | 0.1 | 0.1 | 0.1 | 0.1 |
| Properties | | | | | | | |
| Die Swell | no | yes | no | no | no | no | minor |
| Melt Strength | n.d. | 26 | 22 | 26 | 35 | n.d. | n.d |

*n.d. means not determined. Examples A, B and C are comparative examples.

As can be seen from the results of the table the common blends of polyphenylene ether and a polyamide (Example A) can be readily extruded from the compounding machine. Their melt strength is however unsufficient to shape articles out of this known blend by extrusion.

The blend of Example B with a standard polyphenylene ether and a high viscosity polymide does show a good melt strength, as could be expected since the polyamide forms the continuous phase. Quite unexpectly the comparative blend showed strong die-swell making it unusable for extrusion purposes.

The above results are quite surprising since the polyamide with high viscosity as used in comparative example B itself i.e. without being blended with a polyphenylene ether is perfectly suitable for extrusion purposes.

Using a polyphenylene ether with higher viscosity in combination with a standard polyamide (blend C) results in a blend without die-swell, but with a rather low melt strength.

Only by combining a high viscosity polyphenylene ether with a high viscosity polyamide (Examples I, II, III and IV) was it possible to obtain a material with a good melt strength, without die swell or with minor die-swell only.

We claim:

1. An extrudable thermoplastic composition comprising a compatibilized polyphenylene ether-polyamide resin blend, wherein the polyphenylene ether has an intrinsic viscosity of more than 45 ml/g as measurred in toluene at 25 degrees C. and a concentration of 0.6 gram per 100 ml and wherein the polyamide has a reduced viscosity of more than 175 ml/g as measured in sulphuric acid in accordance with ISO 307 wherein said polyamide is a polyamide 6,6.

2. A composition as in claim 1 wherein the polyphenylene ether has an intrinsic viscosity of at least 50 ml/g and the polyamide has a reduced viscosity of at least 190 ml/g.

3. A composition as in claim 1 wherein the compatibilized polyphenylene ether-polyamide resin blend comprised 5 to 95 weight percent polyphenylene ether resin and 95 to 5 weight percent polyamide resin, based upon the weight of polyphenylene ether and polyamide together.

4. A composition as in claim 3 wherein said polyamide resin constitutes a continuous phase in an amount greater than 35 weight percent of the compatibilized polyphenylene ether-polyamide resin blend.

5. A composition as in claim 1 wherein the compatibilized polyphenylene ether-polyamide resin blend is compatibilized with a compatibilizing agent selected from the group consisting of maleic anhydride, fumaric acid, citric acid, malic acid, and reaction products of a polyphenylene ether and trimellitic anhydride acid chloride.

6. A composition as in claim 1 wherein said polyphenylene ether resin is a polymer or copolymer comprised of one or more units derived from units selected from the group consisting of 2,6-dimethyl phenol units and 2,3,6-trimethyl phenol units.

7. A composition as in claim 6 wherein said polyphenylene ether is poly(2,6-dimethyl-1,4-phenylene ether).

8. A composition as in claim 1 further comprising an agent to improve the impact strength.

9. A composition as in claim 1 further comprising an additive selected from the group consisting of reinforcing fibers, stabilizers, dyes, pigments, polyolefins, flame retardants, and mixture thereof.

10. Articles formed out of the composition of claim 1.

11. The composition of claim 5 wherein the compatibilizing agent is citric acid.

12. The composition of claim 9 wherein the agent to improve the impact strength is a block copolymer.

* * * * *